United States Patent
Tierney et al.

[11] Patent Number: 5,163,744
[45] Date of Patent: Nov. 17, 1992

[54] COMBINED TRACTION CONTROL AND ANTI-LOCK BRAKING SYSTEM

[75] Inventors: Gordon L. Tierney, Washington; Robert J. Hammersmith, Shelby Township; Ronald Paul, Detroit, all of Mich.; Donald L. Parker, Middletown; Donald E. Schenk, Vandalia, both of Ohio

[73] Assignee: General Motors Corporation, Detroit, Mich.

[21] Appl. No.: 779,759

[22] Filed: Oct. 21, 1991

[51] Int. Cl.⁵ ............................................. B60T 8/58
[52] U.S. Cl. ................................ 303/115.2; 303/113.2
[58] Field of Search ............ 303/113 TR, 115 EC, 303/113 R, 115 PP, 116 R, 116 SP

[56] References Cited

U.S. PATENT DOCUMENTS

| | | | |
|---|---|---|---|
| 4,768,843 | 9/1988 | Baughman et al. | 303/113 TR |
| 4,805,965 | 2/1989 | Jonner et al. | 303/113 TR |
| 4,957,331 | 9/1990 | Burton et al. | 303/115 EC |

Primary Examiner—Matthew C. Graham
Attorney, Agent, or Firm—Ernest E. Helms

[57] ABSTRACT

To provide an ABS/TC integration and method of utilization thereof which is an alternative to those previously provided and to maximize the utilization of the actuator in both the ABS and TC functions the present invention is brought forth. The present invention provides an ABS/TC integration with a common actuator which maximizes the operation of the actuator when in either an ABS or TC braking mode.

13 Claims, 1 Drawing Sheet

COMBINED TRACTION CONTROL AND ANTI-LOCK BRAKING SYSTEM

FIELD OF THE INVENTION

The field of the present invention is that of an integrated anti-lock braking system (ABS) and traction control system (TC) for a vehicle.

DISCLOSURE STATEMENT

Anti-lock braking systems typically modulate the pressure delivered to a vehicle wheel brake to prevent the vehicle wheel from locking up in the braking condition. Conversely, traction control often incorporate an automatic braking system which actuates the brakes to prevent spinning of the vehicle wheel thereby maximizing the traction which can be exerted by that wheel. A more detailed analysis of anti-lock braking systems can be found in commonly assigned U.S. Pat. Nos. Mikhaeil-Boules et al USPN 5,000,523 and Matouka et al USPN 5,011,237. A more detailed explanation of a traction control system which utilizes actuation of a vehicle wheel brake for traction control can be found in commonly assigned Cogswell et al, USPN 4,976,500.

Examples of ABS/TC integrations can be found in commonly assigned Vennemeyer et al U.S. Pat. No. 5,029,950 Villec U.S. Pat. No. 5,042,885, now U.S. Pat. No. 5,042,188 and Quinn, U.S. Pat. application No. 07/671,570 filed Mar. 19, 1991 and Parker et al, U.S. Pat. No. 4,938,543.

Modulation of the vehicle brake pressure is a functional requirement, common to both ABS and TC control modes. Though both modes do not occur concurrently they can follow each other immediately in any order. For this reason use of a common electrical hydraulic component to provide the ABS and TC functions appears logical. The component which is often called a pressure actuator or modulator must be designed such that the transition from one operating mode to another meets all response requirements. The actuator design must consider the requirements for maximum pressure apply loads, maximum pressure decrease, pressure apply and release rates, and volumes compatible with the vehicle wheel caliper (or wheel brake cylinder) characteristics for both ABS and TC operating modes. The above should be accomplished with minimum motor power requirements and minimal actuator volume and complexity.

One of the major design criterias for an anti-lock braking system is that the first pressure release cycle occur as rapidly as possible. Since the Ⓡfluid pressure within the brake is typically at a high level at the initiation of the ABS cycle a slight volumetric change in the control volume exposed to the vehicle wheel brake will greatly diminish the pressure within the same (assuming that the vehicle wheel brake is exposed to a closed but variable control volume). Therefore, to minimize torque requirements of the actuator (torque is directly related to current requirement of the motor) the modulator should have a relatively small bore with rapid piston movement.

In contrast, in a traction control system it is usually necessary to achieve a fairly extreme diminition of the control volume exposed to the vehicle brake before the fluid pressure can arise. Accordingly, the actuator should have a relatively large bore with slower piston movement to minimize power requirements on the motor. Therefore, when providing an ABS/TC integration which utilizes a common actuator, that which works best for ABS tends not to work best for traction control and vice versa.

SUMMARY OF THE INVENTION

To provide an ABS/TC integration and method of utilization thereof which is an alternative to those previously provided and to maximize the utilization of the actuator in both the ABS and TC functions the present invention is brought forth. The present invention provides an ABS/TC integration with a common actuator which maximizes the operation of the actuator when in either an ABS or TC braking mode.

Other objects and advantages of the present invention can become more apparent to those skilled in the art as the nature of the invention is better understood from the accompanying drawings and a detailed description.

DETAILED DESCRIPTION OF THE DRAWINGS

Figure 1:
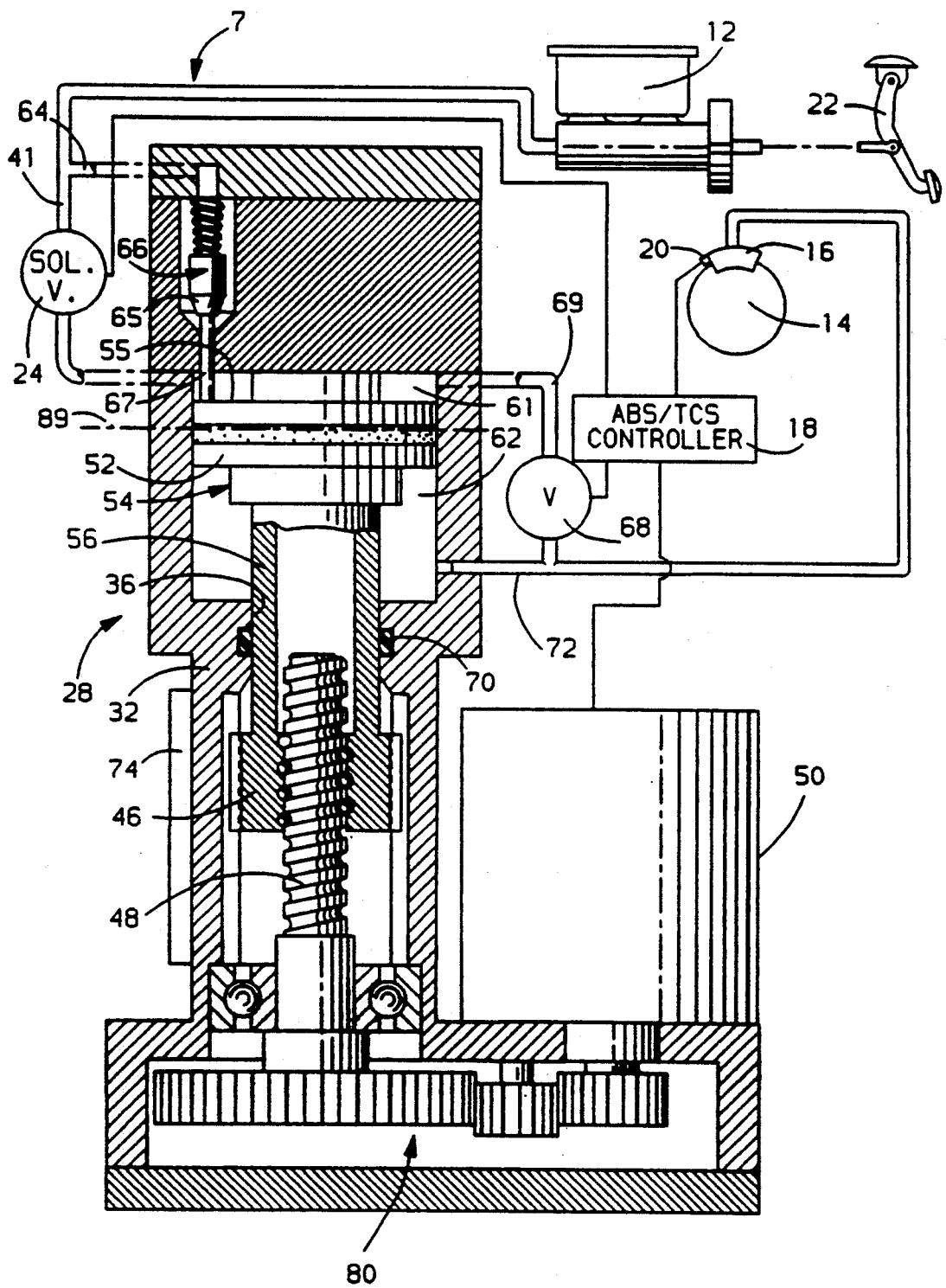
FIG. 1 is a schematic view partially sectioned of a preferred embodiment ABS/TC integrated braking system according to the present invention.

The vehicle wheel ABS/TC braking system integration 7 of the present invention includes a master cylinder 12 for supplying pressurized fluid. Connected on the vehicle adjacent a wheel 14 is a fluid activated wheel brake cylinder 16 (hereinafter referred to as a wheel brake) which receives pressurized fluid from the master cylinder for restraining rotational movement of the wheel 14. The wheel brake 16 utilized may be a conventional drum or disc type vehicle brake.

An ABS/TC electronic controller 18 is also provided. A sensor 20 at the vehicle wheel brake 16, determines the wheel 14 rotational speed and a sensor (not shown) determines whether or not the brake pedal 22 of the vehicle is activated. Both sensors feed information to the ABS/TC controller 18. The ABS/TC controller will be cognizant of the rotational condition of the wheel 14 along with the other vehicle wheels and will provide an appropriate signal in response thereto. The signal will selectively place the integration in an ABS or TC mode of operation if the condition of the wheel 14 is within preset parameters.

The integration has an actuator 28 with a frame 32 multidiametered bore 36. Sealably and slidably mounted within the bore is a head 52 of a piston 54 with a connected rod 56. The piston head 52 bifurcates the bore 36 into a first pressure chamber 61 and a second pressure chamber 62 opposite the first pressure chamber towards the piston rod 56. Additionally, the second pressure chamber is sealed adjacent the interface of the piston rod with a sealing member 70.

The master cylinder 12 has a first fluid path 41 connection via a normally open solenoid valve 24 with the first chamber 61. Additionally, the master cylinder 12 has an alternative fluid connection 64 with the actuator bore via a poppet type check valve 66 which can be activated to an open position by contact with the piston head 52. Connecting the first 61 and second 62 chambers of the actuator bore is a second fluid path 69 having a second normally -open solenoid valve 68 inserted therein. A third fluid path 72 which intersects with the second fluid path 69 connects the second chamber 62 with the vehicle wheel brake 16.

A sensor 74 is provided which allows the controller 18 to determine the location of the piston within the bore 36. Alternatively a brushless motor can be utilized and the sensor can determine the position of the piston 54 within the bore 36 by information gathered by the rotation of a motor 50 utilized to power the piston 54. The piston 54 is reciprocally driven by the motor 50 via a drivetrain 80 which is torsionally associated with a drive or ball screw 48. The ball screw 48 is threadably associated with a nut 46 which is nonrotative and is operationally associated with the piston rod 56.

The check valve 66 has a poppet 65 with a stem 67 for contact with the head 52 of the piston. Positioning of the piston head 52 within a predetermined range will cause the poppet 65 to be open against its spring biasing therefore allowing communication between the first chamber 61 and the master cylinder 12 via the alternative path 64. When the piston 54 is in the home or full position, the check valve 66 will be held open. The above allows continued brake system operation in cases where there is total failure in the first solenoid valve 24 or in the first fluid path. (Note: the first solenoid valve is fabricated to always fail in the open position.)

To provide the most optimum response an efficient drive will be utilized between the drive screw 48 and its threadably engaged nut 46. Therefore when in the illustrated home position, some type of torsional brake will be utilized to keep pressure within the first chamber 61 from backdriving the piston head 52. Two such braking mechanisms which can be utilized are explained in detailed in aforementioned U.S. Pat. Nos. 5,000,523 and 5,011,237.

In normal brake apply both solenoid valves 24, 68 are open. Therefore, fluid flows from the master cylinder 12 via the first fluid path 41 into the first chamber 61 then to the second fluid path 69 past the second solenoid valve 68 into the wheel brake. Return flow utilizes the same path.

Additionally, there is flow of brake fluid from the master cylinder 12 into the first chamber 61 through the check valve 66.

If an ABS condition is noted by the controller 18 the first solenoid valve 24 will be closed and the second solenoid valve 68 will open. The motor 50 will be signalled to power piston 54 downward. The variable control volume of the second pressure chamber 62 exposed to the wheel brake 16 will decrease, however the variable control volume of the first pressure chamber 61 will increase and since the piston valve rod 56 is being retracted the total variable control volume exposed to the wheel brake 16 will increase therefore relieving pressure within the wheel brake 16. ABS pressure reapply will be accomplished by the motor 50 reversing the piston 54. When the ABS condition ceases, the first solenoid valve 24 will reopen and the piston 54 will travel upward towards its home position which is accomplished by the controller signalling the motor 50 to fully extend the piston 54 upward. As the piston returns if the pressure within the wheel brake 16 exceeds the pressure in the master cylinder 12 then the check valve 66 will be opened to allow additional flow to limit the pressure in the wheel brake 16 to that slightly above the pressure in the master cylinder 12.

In a traction control situation starting from the home position, the first solenoid valve 24 remains open and the second solenoid valve 68 will be closed. The piston 54 will be driven downward which will increase the pressure in the wheel brake 16 by decreasing the variable control volume exposed to the wheel brake 16 which will now be solely the second pressure chamber 62. A release cycle in traction control will be affected by reversal of the piston 54, that is the piston again extending upward. Cessation of the traction control mode will cause the second solenoid valve 68 to be reopened and the controller 18 to actuate the motor 50 driving the piston 54 upward to its home position.

In the present situation wherein there is no sensor to tell the controller 18 where the piston 54 is there is a current feed back (F/B) resistor in the motor control loop. The current is the result of the applied voltage minus the internally generated voltage (counter EMF) divided by the internal impedance of the motor 50. The counter E.M.F. is the product of a voltage constant times the motor 50 rotational speed. The current is at the maximum value when the applied voltage is at a maximum and the motor 50 is not moving (no counter EMF). The stalled condition is then detected by the maximum current value sustained for a predetermined number of computer loops.

If the actuator 7 is in a prior traction control mode and ABS is now requested by the controller 18 (due to a change in conditions), before the piston 54 reaches its home position, the first solenoid valve 24 will be closed and the second solenoid valve 68 will be open. The piston 54 will be reversed and travel downward which results in a decreasing pressure to the wheel brake 16.

If the braking system is going through an ABS mode of operation and traction control is requested before the piston 54 again reaches its home position, the first solenoid valve 24 will be opened and the second solenoid valve 68 will be closed and the piston will be reversed downward to increase the pressure to the vehicle brakes.

In the aforementioned methodology of operation, the sensor 74 is not required, however, in an alternative preferred method of operation, the position sensor 74 is required. Normal braking operation of the braking integration 7 is as previously described.

The following description explains the sequence of solenoid activation and piston direction in order to change from an ABS to a traction control mode or vice versa which presents a somewhat faster and more effective manner of operation. This method requires that the piston position information be relayed to the controller 18. Typically for many brake systems a predetermined amount of brake fluid approximating .15 cubic inches is the volume of fluid needed when in a traction control mode of operation for maximum brake pressure for a front-wheel-drive type vehicle. (The set point volume is determined by the pressure volume relationship of the brake lines and wheel brake.) The set point can easily be changed to another set point via software for a rear drive-type vehicle.

When the piston is in the home position, if ABS mode is requested the first solenoid valve 24 will be closed and the second solenoid valve 68 will be opened and the piston 54 will be driven in a retracted direction to lower the wheel brake 16 pressure. To increase the wheel brake 16 pressure the piston 54 will be reversed to an extending direction. When the ABS condition is terminated, the first solenoid valve 24 will be reopened and the piston 54 will move upward to the home position.

If a traction control situation is realized (before a prior ABS condition has terminated) and the volume of the fluid in the first chamber 61 is less than 0.15 cubic inches, then the first solenoid valve 24 will be opened and the second solenoid valve 68 will be closed and the piston will drive downward to increase the pressure until the volume in the first chamber exceeds 0.15 cubic inches. When the piston top 55 reaches the 0.15 cubic inches in position 89 (shown in FIG. 1), the first solenoid valve 24 will be closed and the second solenoid valve 68 will be reopened and from this point onward TC pressure apply cycles will be performed by extending the piston 54 and TC pressure relief cycles will be performed by retracting the piston 54.

If the volume of the fluid above the piston 54 is more than 0.15 cubic inches, then the first solenoid valve will then remain closed (previously closed in the ABS mode) and the second solenoid valve will remain open and the piston 54 will be driven upwards to the home position thereby increasing pressure in the vehicle wheel brake on the first cycle of traction control.

For traction control in an initial condition with the piston 54 in the home position, the first solenoid valve 24 remains open and the second solenoid valve 68 is closed and the piston will drive downward until the fluid in the first chamber 61 exceeds 0.15 cubic inches. (Brake pressure is now increasing during the downward stroke.) After the first pressure chamber obtains a volume equal or exceeding 0.15 cubic inches, the first solenoid valve 24 will then be closed and the second solenoid will be opened and the piston 54 will be reversed to extend to increase the pressure at the wheel brake 16 or retract to relieve the pressure at the wheel brake 16 until the traction control condition has terminated. If traction control is terminated by cessation of traction control conditions or by application of the vehicle brake pedal 22 then the first solenoid valve 24 will be opened and the second solenoid valve 68 will be opened and the piston 54 will be moved upward to the home position.

If in the middle of a traction control situation, an ABS condition is then signalled, the second solenoid valve 68 will be closed (the first solenoid valve 24 is already open and the piston 54 will move upward to the home position. Brake pressure is now being reduced from the base brake pressure. If higher pressure at the brakes is required (after the first ABS pressure relief cycle) the first solenoid valve 24 will be opened or remain open and the second solenoid valve 68 will be open and the piston 54 continues to move upward toward the home position. Wheel brake 16 pressure is now equalized or close to base brake pressure (master cylinder 12). If a lower brake pressure is required (a second ABS pressure relief cycle) after the higher pressure cycle, the second solenoid valve 68 will be reclosed and the piston 54 continue upwards to its home position therefore reducing brake pressure to the vehicle wheel brake 16. After the piston 54 reaches the home position continued ABS operation will have the first solenoid valve 24 in a closed position and pressure relief will occur by retracting the piston and pressure apply will occur by extending the piston as in normal ABS operation.

The above described method of operation allows the actuator to minimize power requirements and volume requirements while maximizing response in transitional occurrences of ABS or TC operation.

While a few of the embodiments of the present invention have been explained it will be readily apparent to those skilled in the art of the various modifications which can be made to the present invention without departing from the spirit and scope of this application as it is encompassed by the following claims.

We claim:

1. An anti-lock braking/traction control integrated vehicle wheel braking system for a vehicle wheel comprising:

wheel brake means for restraining rotation of the vehicle wheel;

master cylinder means for delivering pressurized fluid to the wheel brake means;

sensor means to determine the rotational condition of the wheel;

an anti-lock braking/fraction control controller means cognizant of the rotational condition of the vehicle wheel via the sensor means dna able to selectively signal the system to an anti-lock braking mode and to a traction control mode in response to the signal of the sensor means;

an actuator frame with a bore;

a piston with a rod and a head, the head being sealably mounted within the bore bifurcating the same into first and second chambers, the first chamber being on a side of the head opposite the rod, and the second chamber being on a side of the head adjacent to the rod;

a first fluid path connecting the master cylinder means with the first chamber;

a second fluid path connecting the first and second chambers external to the bore;

a third fluid path connecting the second chamber with the wheel brake means;

first and second solenoid valve means in the respective first and second fluid paths governed by the controller means;

threaded device means operatively associated with the piston rod;

motor means governed by the controller means torsionally associated with the drive means and in concert with the controller means and the first and second solenoid valves selectively manipulating the pressure within the wheel brake means to respect to a normal brake applied mode and an anti-lock braking mode and a traction control mode condition.

2. A vehicle braking system as described in claim 1 further including a check valve within the first chamber allowing cliff flow from the first chamber to the master cylinder means when the pressure within the first chamber exceeds that within the master cylinder means.

3. A braking system as described in claim 2 further including check valve opening means associated with the piston allowing the opening of the check valve opening means whenever the piston is in an area adjacent to the check valve opening mean within a preset location.

4. A braking system as described in claim 1 further including a piston locator sensor means for making the controller means cognizant to the location of the piston within the actuator bore.

5. A braking system as described in claim 1 wherein said drive means is backdriveable by a pressure force acting on the piston and wherein there is a torsional brake means to lock the piston at a given position to prevent pressurized backdriving of the piston.

6. A braking system as described in claim 1 further including a piston rod operatively associated with a nonrotative nut end wherein the drive means includes a drive screw threadably engaged with the nut.

7. An anti-lock braking system/ tracking control integrated vehicle wheel braking sytem comprising:
  wheel brake mans of restraining rotation of the vehicle wheel;
  master cylinder means for delivering pressurized fluid to the wheel brake means;
  a wheel sensor to determine the rotational condition of the wheel;
  an anti-lock braking/traction control controller means cognizant of the rotational condition of the vehicle wheel via the wheel sensor and able to selectively signal the sytem to an anti-lock braking mode and a traction control mode in response to the signal of the wheel sensor;
  an actuator frame with a bore;
  a piston with a rod having a head sealably mounted within the bore bifurcating the same into first and second chambers, the first chamber being on a die to the head opposite the rod and a second chamber being on a side of the head toward the rod;
  check valve means within the first chamber allowing fluid flow from the first chamber to eh master cylinder means when the pressure within the first chamber excess the pressure within the master cylinder means, such check val e means additionally having means of opening also when the piston is within the predetermined distance of the check valve means;
  a first fluid path connecting the maser cylinder means with the first chamber;
  a second fluid path connecting the first and second chambers external to the control volume of the actuator bore;
  a third fluid path connecting the second chamber with the wheel brake means;
  first and second normally open solenoid valve means in the respective first and second fluid paths, the solenoid valve means being governed by the controller means;
    drive means including a drive screw threadably associated with the piston rod having a nontranslational rotational axis and being torsionally associated with a motor governed by the controller means and in concert with the controller means and the first nd second solenoid valve means electively manipulating the pressure within the wheel brake means to response to a normal brake applied mode and an anti-lock braking mode condition and a traction control mode condition.

8. A braking system integration as described in claim 7 further including a position sensor allowing the controller means to know the location of the piston within the bore.

9. An integration as described in claim 8 wherein the controller means is programed to return the piston to a home position whenever the integration is in a normal brake apply mode.

10. A method of utilizing an anti-lock braking/traction control integration to modulate the pressure within a vehicle wheel rake, the integration including a piston having a head which is sealably slidably mounted within a bore dividing a the bore into a first chamber and a second chamber and a rod connected with the piston and sealed within the second chamber, the first chamber being connected with a master cylinder via a first fluid path and the first and second chambers being joined together by a second fluid path and there being a third fluid path joining the second chamber with the wheel brake and wherein there are first and second solenoid valves governed by a controller in the respective first and second fluid paths and wherein there is a lockable drive means threadably associated with the piston rod to cause transactional movement of the piston rod in response to the signals given by the controller which selectively places the system integration at an anti-lock braking mode and a traction control mode and normal baring mode, the method comprising:
  opening the first and second solenoid valves to allow normal brake apply;
  closing the first solenoid valve and opening the second solenoid valve and retracting the piston increasing the volume of the first pressure chamber to diminish the pressure within the wheel brake on an anti-lock braking pressure relief cycle and reversing the piston to increase the pressure on an anti-lock braking apply cycle by extending the piston diminishing the volume of the first pressure chamber; and
  opening the first solenoid valve and closing the second solenoid valve and retracting the piston decreasing the control volume of the second pressure chamber to increase the pressure within the wheel brake on a traction control pressure applied cycle and reversing the piston on a traction control release cycle.

11. A method of utilizing an antilock braking/traction control system integration to modulate the pressure within a vehicle wheel brake, the integration including a piston having a head which is sealably slidably mounted within a bore dividing the bore into a first chamber and a second chamber and a rod connected with the piston and sealed within the second chamber, the first chamber being connected with a master cylinder via a first fluid path and the first and second chambers being joined together by a second fluid path and there being a third fluid path joining the second chamber with the wheel brake and wherein there are first and second solenoid valves governed by a controller in the respective first and second fluid paths and wherein there is a lockable drive means threadably associated with the piston rod to cause transactional movement of the piston rod in response to the signals given by the controller which selectively places the system integration at an anti-lock braking mode and a traction control mode and a normal braking mode, the method comprising:
  opening the first and second solenoid valves the allow normal brake apply while maintaining the piston at a home position;
  closing the first solenoid valve and opening the second solenoid valve and retracting the piston from a home position to relieve the pressure with the wheel brake and expending the piston for pressure reapply, and when the controller switches to an ABS mode from a previous mode wherein the piston is not at the home position, extending the piston towards the home position and opening the first solenoid valve and closing the second solenoid valve to relieve the pressure within the wheel brake and, reopening the second solenoid valve to provide an ABS reapply cycle, and reclosing the second solenoid valve to provide an ABS secondary relief cycle and then as the piston returns to the home position continuing anti-lock tracking mode operation by closing the first solenoid valve and opening the second solenoid valve and retracting the piston to provide anti-lock braking pressure relief cycles and extending to piston to provide anti-lock braking pressure apply cycles; and moving the piston toward a position wherein there is a predetermined amount of fluid in the first pressure chamber and, if the first chamber has more than the predetermined amount at the beginning of the traction control mode then closing the first solenoid valve and opening the second solenoid valve to provide a pressure apply cycle and thereafter reaching the predetermined position closing the second solenoid valve and transacting the piston for pressure apply traction control cycles and extending the piston for pressure relief traction control cycles and when the amount within the first chamber is less than the predetermined amount then opening the first and closing the second solenoid valves and retracting the piston for pressure apply cycles and extending the same for pressure relief cycles.

12. A method of utilizing an antilock braking/traction control system integration to modulate the pressure within a vehicle wheel brake, the integration including a piston having a head which is sealably slidably mounted within a bore dividing the bore into a first chamber and a second chamber and a rod connected wih the piston and sealed within the second chamber, the first chamber being connected with a master cylinder via a first fluid path and the first and second chambers being joined together by a second fluid path and there being a third fluid path joining the second chamber with the wheel rake and wherein there are first and second solenoid valves governed by a controller in the respective first and second fluid paths and wherein there is a lockable drive means threadably associated with the piston rod to cause translation movement of the piston rod in response to the signals given by the controller which selectively places the system integration at an anti-lock braking mode and a traction control mode and a normal braking mode, the method comprising:

opening the first and second solenoid valves to allow normal brake apply while maintaining the piston at a home position;

closing the first solenoid valve and opening the second solenoid valve and retracting the piston from a home position to relieving the pressure with the wheel brake and extending the piston for pressure reapply, and when the controller switches to an anti-lock braking mode from a previous mode wherein the piston is not at the home position, extending the piston towards the home position and opening the first solenoid valve and closing the second solenoid valve to relieve the pressure within the wheel brake, and reopening the second solenoid valve to provide an anti-lock braking reapply cycle, and reclosing the second solenoid valve to provide an anti-block braking secondary relieve cycle and then as the piston returns to the home position continuing anti-lock braking operation by closing the first solenoid valve and opening the second solenoid valve and retracting the piston to provide anti-lock raking pressure relief cycles and extending the piston to provide anti-lock braking pressure apply cycles.

13. A method of utilizing an antilock braking/traction control system integration to modulate the pressure within a vehicle wheel brake, the integration including a piston having a head which is sealably slidably mounted within a bore dividing the bore into a first chamber and a second chamber, and a rod connected wih the piston and sealed within the second chamber, the first chamber being connected with a master cylinder via a first fluid path and the first and second chambers being joined together by a second fluid path and there being a third fluid path joining the second chamber with the wheel brake and wherein there are first and second solenoid valves governed by a controller in the respective first and second fluid paths and wherein there is a lockable drive means threadably associated wih the piston rod to cause translation movement of the piston rod in response to the signals given by the controller which selectively places the system interaction at an anti-lock braking mode and a traction control mode and a normal braking mode, the method comprising:

opening the first and second solenoid valves to allow normal brake apply while maintaining the piston at a home position;

moving the piston toward a predetermined position wherein there is a predetermined amount of fluid in the first pressure chamber and, if the first chamber has more than the predetermined amount the beginning of the traction control mode, then closing the first solenoid valve and opening the second solenoid valve to provide a pressure apply cycle and thereafter reaching the predetermined position losing the second solenoid valve and retracting the piston for pressure apply traction control cycles and extending the piston for pressure relief traction control cycles and when the amount within the first chamber is less than the predetermined amount than opening the first and closing the second solenoid valves and retracting the piston for pressure apply cycles and extending ht same for pressure relief cycles.

* * * * *